(No Model.)
G. E. ADAMS.
BAR OR TOGGLE.
No. 273,792. Patented Mar. 13, 1883.
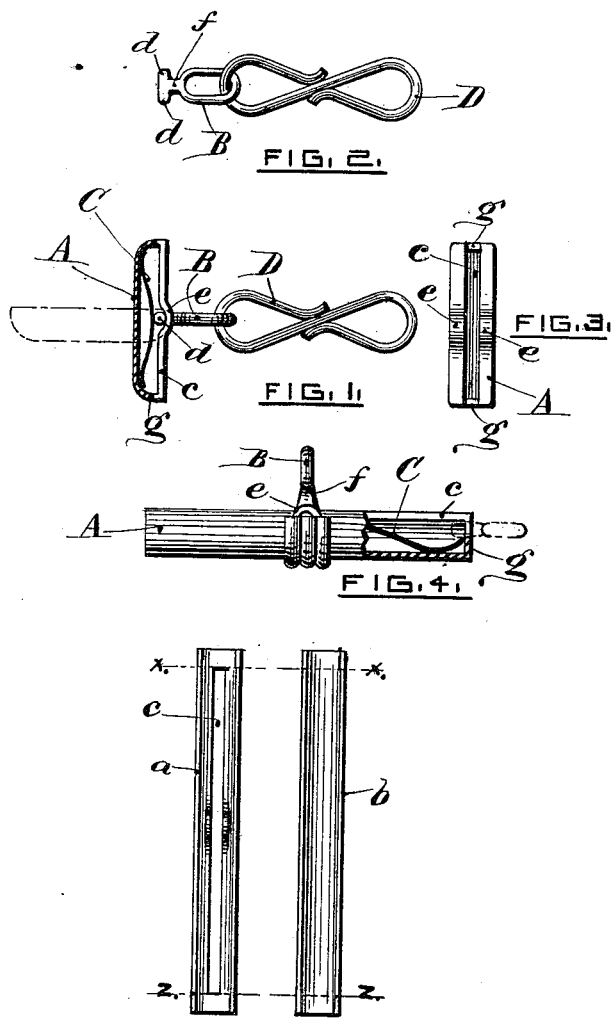
WITNESSES, INVENTOR,

UNITED STATES PATENT OFFICE.

GEORGE E. ADAMS, OF PROVIDENCE, RHODE ISLAND.

BAR OR TOGGLE.

SPECIFICATION forming part of Letters Patent No. 273,792, dated March 13, 1883.

Application filed January 8, 1883. (No model.)

*To all whom it may concern:*

Be it known that I, GEORGE E. ADAMS, of the city and county of Providence, in the State of Rhode Island, have invented a new and useful Improvement in Bars or Toggles, of which the following is a specification, reference being had to the accompanying drawings.

My invention relates to bars or toggles of ornamental or other chains, buttons, and other articles.

Figure 1 is an elevation of a longitudinal section of the bar with attached ring and link or connecting-rod. Fig. 2 is a view of the ring, loop, or eye, with neck, arms, and link. Fig. 3 is an elevation of the bar, showing the slotted side or face thereof. Fig. 4 is a view of the complete bar, showing the position of end of spring through a partial longitudinal section. Figs. 5 and 6 show elevations of the two parts of the bar as struck up.

My invention consists of a bar or toggle so constructed that the attached eye may be passed to one or both ends thereof, and there turned parallel therewith, forming a continuation thereof, thus facilitating its use. (See Fig. 1.)

In the accompanying drawings, A is the toggle; B, the eye or the ring; C, the spring; D, the connecting-link; $a$, the slotted portion of the toggle; $b$, the other portion thereof; $c$, the slot in the part $a$; $d$, the arms or shoulders of the eye; $e$, the elevations serving as bearings; $f$, the neck connecting the eye with the arms; $g$, the ends of the toggle.

The toggle may be composed of metal or other desired material. It is slotted preferably throughout its entire length. It is of any desired shape. Longitudinally and laterally or transversely it may be oval or elliptical; or its edges may be circular, triangular, quadrangular, octagonal, &c., while its sides may be flat, curved, &c.; or it may be cylindrical or tubular in shape, or of almost any desired shape. Its sides $a$ $b$, Figs. 5 and 6, may be struck up from plated metal or other suitable stock. If it is desired to have the toggle slotted throughout its length, $a$ may be slotted between the lines $x$ $x$ and $z$ $z$, or from one of its ends across one and to the other line. If it were slotted from end to end, it would thereby be separated into two parts, whereby certain practical difficulties would be encountered in fastening together the parts of the toggle.

The spring C, composed of steel or other suitable metal, is preferably flat, and of just sufficient length to be received within the toggle, parallel with the length thereof. It should be bent and placed so that the convex surface may constantly press upward toward the slot. If the slot does not extend the whole length of the bar, the spring need not necessarily extend farther than does the slot, being fastened at the slotted end of the toggle. If the slotted part $a$ is flat, or nearly so, transverse elevations $e$, Figs. 1, 3, and 4, are made therein, equidistant, or nearly so, from the ends, to serve as bearings for the arms $d$, Fig. 2; but if the lateral surface of such part be rounded or tubular in shape, then notches may be made in the edges thereof in lieu of the elevations; or, if desired, recesses may be made. After inserting the spring in the part $b$, bent as indicated, (see Figs. 1 and 4,) and placing the arms $d$ within the bearings $e$, the parts $a$ $b$ are fastened together by soldering, swaging, or otherwise. The ends are then cut off through the lines $x$ $x$ and $z$ $z$, and suitable pieces of metal or other material, $g$, Figs. 1, 3, and 4, properly slotted, (see the end $g$, Fig. 4,) are fastened by soldering or otherwise over the ends of the toggle. If the parts $a$ $b$ are oval, &c., longitudinally, no end pieces will be required, as no apertures or openings will appear after the parts are fastened together. In such case the slot in the part $a$ should be extended into the edge of the part $b$, to allow of the extension of the eye, as indicated. The slots in the ends $g$ are designed to receive the neck $f$ when the eye B is extended beyond the bar. The neck $f$ is constructed with flat sides, and with a breadth nearly equal to the width of the slot, whereby the eye and pivots are kept from turning and held in their proper places. The toggle as thus formed may be connected to a chain or other object by means of the eye B, as seen in Fig. 2. (See link D.) The arms $d$ are kept within the bearings or elevations $e$ by the lateral pressure of the spring C, constantly exerted. The arms are easily released from the bearings by taking the eye between the thumb and finger and pressing down upon the spring. The eye may be easily slid the whole length of the slot, and extended by means of the end slots beyond the bar, as indicated, thus facilitating the latter's insertion into and through an aperture, after which the arms may be returned to their bearings.

What I claim as my invention is—

1. A bar or toggle having an eye or ring adapted to be passed through a slot to either or both ends of the bar, and extended parallel or nearly parallel with the bar through end slots, bearings constructed within the toggle and designed to receive the arms of the eye, an eye or ring with arms or pivots attached thereto by means of a neck or block, a slot extending from one end of the bar to the other, and of a width adapted to receive the neck of the eye, and a spring extending the length of the bar or of the slot, constantly exerting a lateral pressure against the surface of the arms with which it comes in contact, substantially as described.

2. In a bar or toggle, the combination of the parts $a$ and $b$, the former slotted to receive the neck, with the eye B, provided with pivots $d$, and the neck $f$, designed to fit within the slot $c$, with the bearings $e$, designed to receive the pivots $d$, and the spring C, designed to exert a lateral pressure against the pivots $d$, constructed to operate as set forth.

GEO. E. ADAMS.

Witnesses:
D. J. McCARTHY,
IRVING CHAMPLIN.